United States Patent [19]
Truckenbrod et al.

[11] Patent Number: 5,462,174
[45] Date of Patent: Oct. 31, 1995

[54] SIEVE APPARATUS FOR COMBINE

[75] Inventors: Thomas G. Truckenbrod, Mendota; Benjamin E. Ramp, Normal, both of Ill.

[73] Assignee: HCC Inc., Mendota, Ill.

[21] Appl. No.: 231,256

[22] Filed: Apr. 22, 1994

[51] Int. Cl.⁶ .................................................. B07B 1/49
[52] U.S. Cl. ........................ 209/394; 209/674; 460/101
[58] Field of Search ................................ 209/393, 394, 209/395, 396, 674, 660; 460/101, 102

[56] References Cited

U.S. PATENT DOCUMENTS

| 3,334,744 | 8/1967 | James et al. | 209/394 |
| 3,472,377 | 10/1969 | Payne | 209/394 |
| 4,712,568 | 12/1987 | Strong et al. | 209/394 X |
| 4,770,190 | 9/1988 | Barnett | 460/102 |

FOREIGN PATENT DOCUMENTS 1352 of 1907 United Kingdom .................... 209/394

*Primary Examiner*—William E. Terrell
*Assistant Examiner*—Tuan Nguyen
*Attorney, Agent, or Firm*—Michael, Best & Friedrich

[57] ABSTRACT

A sieve assembly for combine includes a frame having side frame and divider members, a wire rotatably supported and extending transversely between the side and divider members. The wire has a majority portion and offset portion and at least one slat mounted thereon including a first pocket for removably receiving the major portion of the wire and a deflectable finger for positively locking the major portion of the wire into the first pocket to prevent accidental displacement of the slat from the wire. The slat includes a second pocket for removably receiving the offset portion of the wire to prevent rotational movement of the wire relative to the slat. In one embodiment, the side frame and divider members have circular apertures through which the wires extend. The inside diameter of these apertures are approximately the same, but slightly larger than, the outside diameter of the wire. The opposite ends of a longitudinal retainer leg of the offset portion of the wire are connected to the major portion of the wire by bends at both connections. The angle of the connecting legs and the radii of the bends are at an angle which permits the offset portion of the wire to be threaded or guided through the apertures in the side and divider members during assembly of the sieve assembly.

16 Claims, 3 Drawing Sheets

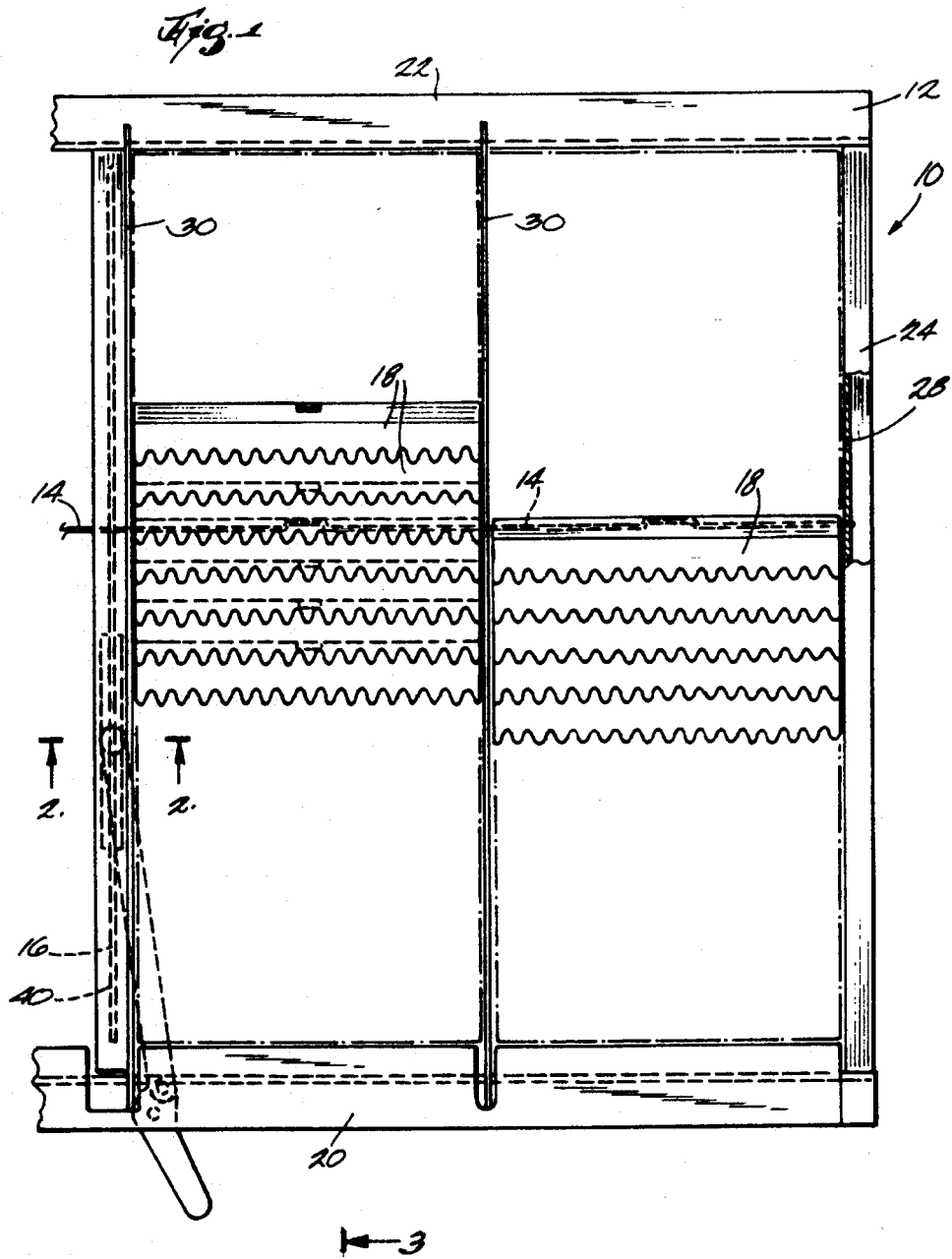
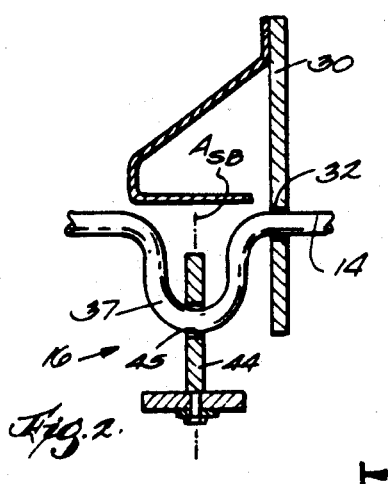
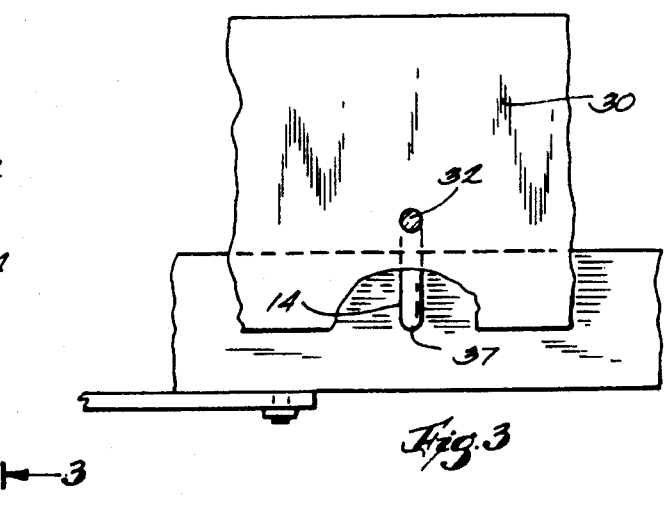

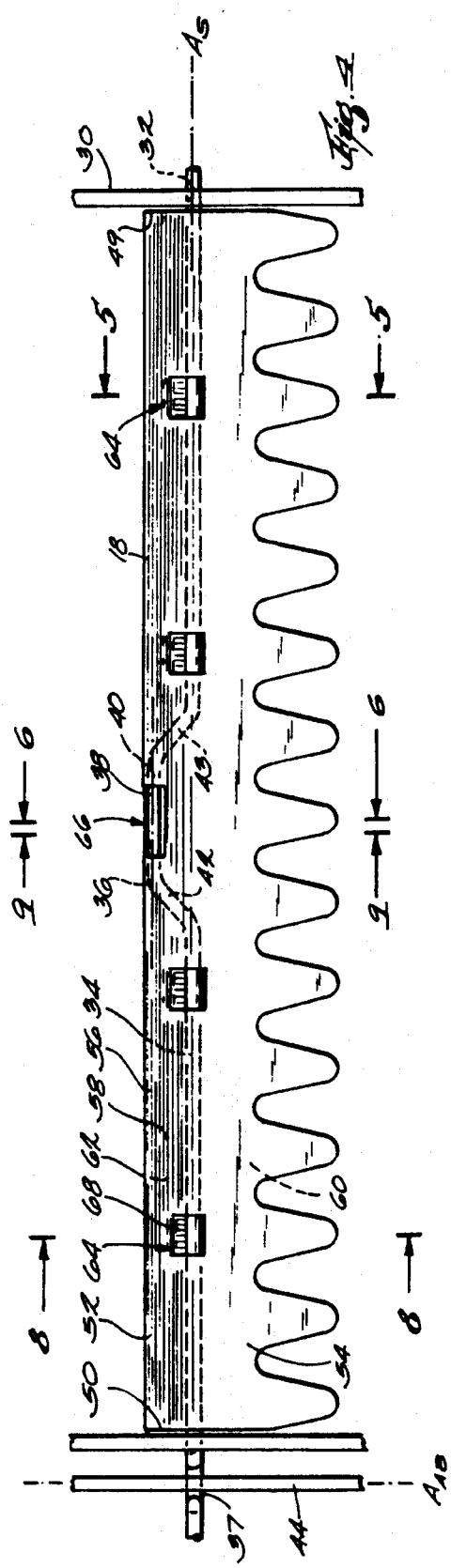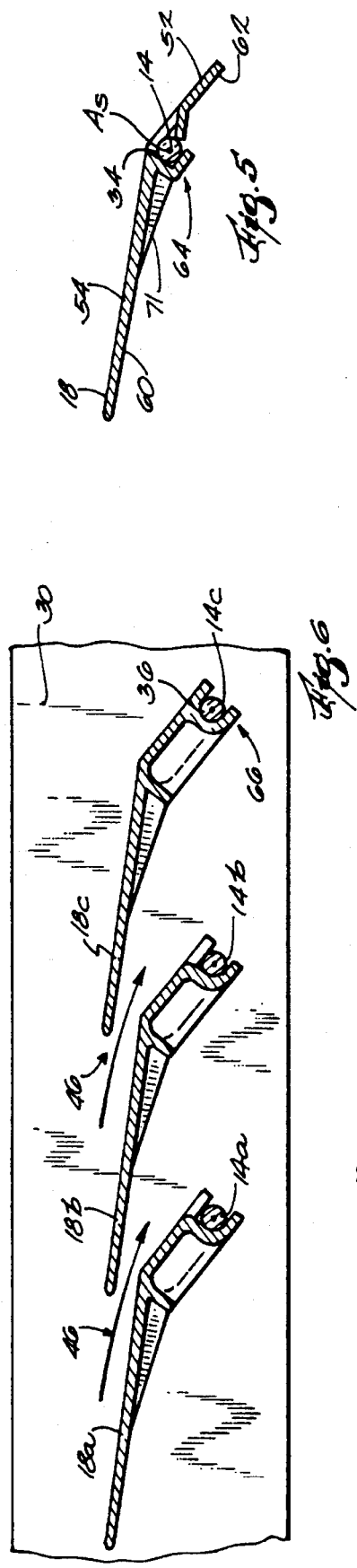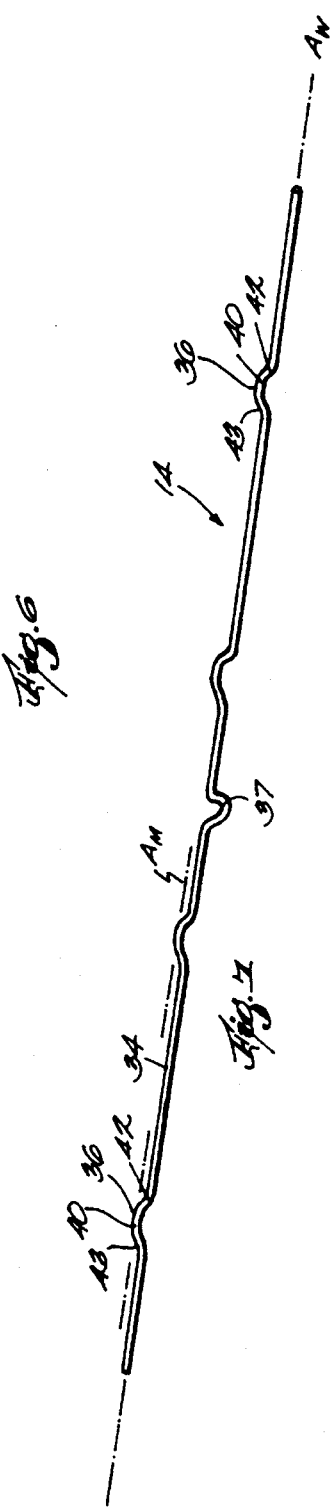

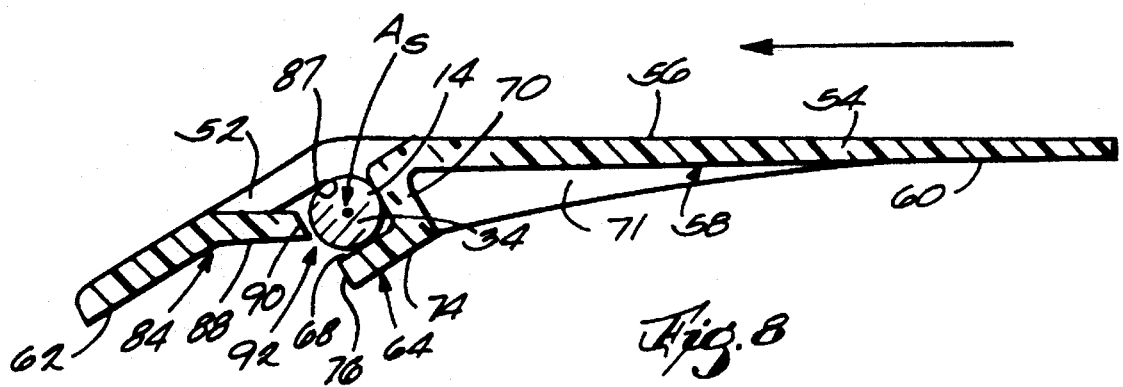
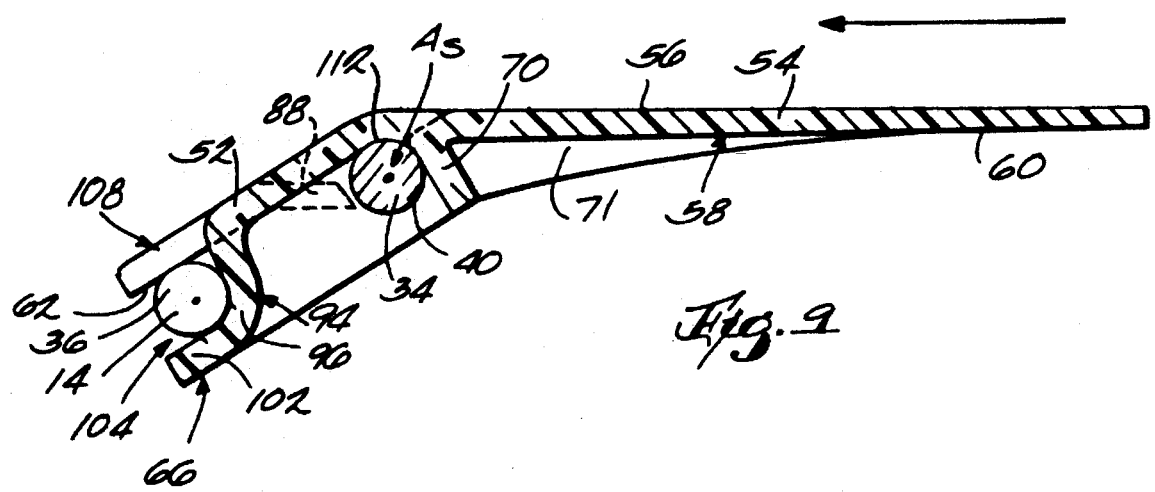

SIEVE APPARATUS FOR COMBINE

BACKGROUND OF THE INVENTION

Field of the Invention

The invention relates to agricultural equipment, and more particularly to a sieve apparatus for use in combines.

Reference to Prior Art

Most grain and seed crops ("grain") are harvested by first roughly detaching the grain from unwanted portions of the source plants and incidental matter such as rocks and weeds by means which are carried in the forward end portions of harvesting combines. A mixture of detached grain and other vegetation parts ("chaff") is carried by conveying means into the interior of the housing of the combine for processing to further separate and recover the grain from the chaff. In the course of processing within the combine, the mixed grain and chaff are passed over agitated sieves which are adapted to permit the grain to fall by gravity therethrough for separation from the larger chaff.

Conventional sieve assemblies include a generally rectangular frame and a plurality of overlapping banks of slats which define sieve openings through which the grain falls by gravity. Each bank of slats typically includes two or more slats separated by a divider(s) and mounted end-to-end on a metal wire rotatably mounted between the side members of the frame, and a sieve assembly typically includes eight or more such overlapping banks of slats in a single rectangular frame. In some cases, a single slat and no divider can be used. The frame typically also includes one or more elongated dividers extending parallel to the side members and including a plurality of longitudinally spaced apertures rotatably supporting the wires intermediate the frame side members. Sieve assemblies are typically assembled by sliding the wires through the respective apertures in each divider, so that the dividers are "strung" on the wires before the ends of the wires are inserted into the frame side members. In some cases, the side members and dividers are split, can be two halves and can be disassembled to remove wires.

The sieve assembly typically also includes an elongated adjustment bar which extends perpendicularly to the metal wires and includes a plurality of longitudinally spaced recesses or apertures for engaging a crank on each wire and thereby controlling the angular disposition of the slats and the size of the openings between the banks of slats. By this arrangement, the slats can be adjusted to any position between fully open and fully closed. The sieve assembly is supported for reciprocal shifting movement or agitation to cause the grain to separate from the chaff and fall downwardly through the openings between the banks of slats.

The slats usually are made from sheet metal and are rigidly secured to the wires by spot welding, soldering or the like. The wire and welds or solder are exposed to material passing between adjacent slots and some materials can become snagged between a slat and the wire, particularly crops or weeds which are bearded and/or have fine stems.

James et al. U.S. Pat. No. 3,334,744 discloses the use of plastic slats including outwardly projecting journals on the opposite ends through which the wire extends. The journals are received for pivotal movement in recesses in the frame dividers and prevent contact and wear between the wires and dividers. Each slat also includes a longitudinally extending tie-gripping portion on the lower surface for receiving the wire. Each wire includes a major portion and a plurality of radially offset portions corresponding to a tie-gripping portion on each slat. Each tie-gripping portion has a longitudinally extending passage for receiving the major portion of the wire and a radially outwardly extending slot for receiving the offset portion. The slot is tapered, with the narrowest part having a width less than the diameter of the wire. The slot and passage are otherwise dimensioned so that, to mount a slat onto a wire prior to assembly of the dividers and frame side members, the major portion of the wire can be pressed through the slot and snapped into place in the passage, and the offset portion is disposed in the slot to thereby retain the slat for common rotation with the wire.

With such an arrangement, the slats must be installed on the wire prior to completing assembly of the side frame member. Also, in the event a slat breaks during use and must be replaced, the side frame member must be disassembled to permit withdrawal of the slat journals. Furthermore, the tie-gripping portions do not positively lock the slat onto the wire. Consequently, if a pulling force is applied on a slat in a direction diametrically opposite to the slot, the slat can be accidentally pulled off the major portion of the wire. When this occurs, the slat is inoperative, because the wire is free to rotate relative thereto. Such a force can be applied when an operator uses a rake or other tool to remove debris, mud, snow, etc. from the sieve assembly.

SUMMARY OF THE INVENTION

The invention provides a sieve assembly including slats which can be installed after assembly of the dividers and frame side members and are positively locked on the wires to prevent accidental displacement of the slats therefrom. The slats preferably are made from a synthetic plastic material.

The wires are configured to facilitate insertion through the frame divider apertures during assembly.

More specifically, the invention provides a sieve assembly including a frame, a wire rotatably supported between side members of the frame, means for reciprocally rotating the wire, and a slat mounted on the wire. The wire includes a major portion having a longitudinal axis and an offset portion spaced radially outwardly from the longitudinal axis. The slat includes first and second wire securing means. The first wire securing means includes a first pocket for removably receiving the major portion and means for positively locking the major portion in the first pocket to prevent accidental displacement of the slat from the wire. The second wire securing means includes a second pocket for removably receiving the offset portion to prevent rotational movement of the wire relative to the slat.

In one embodiment of the invention, the positive locking means includes an arm portion and a finger extending toward the first pocket. The finger includes an outer end portion cooperating with the arm portion to define an opening into the first pocket, the finger being movable between an undeflected position wherein the opening is smaller than the maximum outside dimension of the wire and a deflected position wherein the opening is larger than the maximum outside dimension of the wire whereby, after the finger is deflected to permit the wire to be snapped into the first pocket, the finger returns to the undeflected position and the outer end portion of the finger prevents the wire from being removed from the first pocket. In a preferred embodiment, the finger is arranged so that, as a slat is being moved toward the wire during installation, the finger engages the wire and is cammed thereby to the deflected position.

The invention also provides a sieve assembly comprising a frame including divider members having therein a plurality of longitudinally spaced apertures for rotatably supporting the wires intermediate the frame side members. The wires each include a major portion having a longitudinal axis and an offset portion spaced radially from the longitudinal axis. The offset portion includes a bend having a radius. The inside diameter of each divider aperture is approximately the same as, but slightly greater than, the wire outside diameter, and the bend radii are sufficiently great to permit passing the wires through the divider apertures during assembly of the sieve assembly.

BRIEF DESCRIPTION OF THE DRAWINGS

FIG. 1 is a top plan view of a sieve assembly of the invention.

FIG. 2 is cross sectional view taken generally along line 2—2 in FIG. 1, showing the crank portion of a wire passing through the shift bar and a divider.

FIG. 3 is a partial cross sectional view taken generally along line 3—3 in FIG. 2, showing a wire passing through the shift bar and a divider.

FIG. 4 is an enlarged top plan view of one of the slats shown generally in FIG. 1.

FIG. 5 is a cross sectional view taken generally along line 5—5 in FIG. 4, showing the first wire securing means with the major portion of the wire in place.

FIG. 6 is a cross sectional view taken generally along line 6—6 in FIG. 4, showing adjacent banks of slats and the second wire securing means with the offset portion of the wire in place.

FIG. 7 is a perspective view of the wire shown generally in FIGS. 2–6.

FIG. 8 is an enlarged cross-sectional view taken generally along line 8—8 in FIG. 4, showing the first wire securing means with the major portion of the wire in place.

FIG. 9 is an enlarged cross sectional view taken generally along line 9—9 in FIG. 4, showing both the first and second wire securing means with the major and offset portions of the wire, respectively, in place.

DETAILED DESCRIPTION OF A PREFERRED EMBODIMENT

Illustrated in the various figures is a sieve assembly 10 for use in a combine. The sieve assembly 10 includes a frame 12, a plurality of wires 14, means 16 for controlling the angular orientation of the wires 14, and at least one, preferably two or more, slats 18 mounted on each wire 14.

The frame 12, which usually has a rectangular configuration, includes opposed, elongated front and rear members 20 and 22 and a pair of opposed, elongated side members 24 (one shown). The side members 24 are formed from 12 gauge sheet metal or other suitable rigid material and have a plurality of longitudinally spaced, circular apertures 28 for receiving and rotatably supporting the wires 14. The frame 12 further includes an elongated divider 30 located between adjacent pair of slats 18 as best shown in FIG. 1. In some cases, a single slat 18 can be used on each wire 14 between a pair of side members 24 and no divider 30 is required. The dividers 30 can be formed from 12 gauge sheet metal or other suitable rigid material and have a plurality of longitudinally spaced, circular apertures 32 for receiving and rotatably supporting the wires 14 intermediate the side members 24. The divider apertures 32 and side member apertures 28 have substantially the same inside diameter and are spaced apart by the same equal distance.

Each wire 14 can be formed from a 9 gauge wire or other suitable relatively rigid material and has a circular cross section. As a guide, the wire 14 can have an outside diameter of 0.1483 inches and a length of about 45 inches. As best shown in FIG. 7, each wire 14 includes a major portion 34 having a longitudinal axis $A_W$, a plurality of offset portions 36, preferably one for each slat 18, and a crank portion 37. Each offset portion 36 includes a longitudinally extending retainer leg 40 having a longitudinal axis $A_M$ which is generally parallel to and spaced from the longitudinal axis $A_W$, for example, about 0.6617 inches, and a pair of angled connecting legs 42 and 43 connected between the major portion 34 of the wire 14 and the opposite ends of the retainer leg 40. The connections between the opposite ends of each connecting leg and the major portion 34 and the retaining leg 40 are in the form of bends.

The inside diameter of the circular divider and side member apertures 32 and 28 approximates but is slightly greater than, the outside diameter of the wire 14, so that the wires 14 can be rotated relative to the dividers 30 and side members 24 for controlling the angular orientation of the wires 14 and slats 18, and thereby controlling the size of the openings between the slats 18, as described below. The inside diameter of the circular divider and side member apertures 32 and 28 is only slightly greater than the outside diameter of the wire 14, so that during operation the wires 14 are supported for minimal movement, other than rotational movement, inside the apertures 32 and 28. Otherwise, such movement of the wires 14 inside the apertures 32 and 28 during operation can cause unnecessary wear and failure of the wires 14. As a guide, when the outside diameter of the wire 14 is 0.1483 inch, the inside diameter of these apertures can be 0.156 inch.

The wire 14 preferably is arranged so that it can be installed in circular apertures. Both the major portion 34 and the offset portion 36 of the wire must be guided through circular divider apertures 32. In order to accomplish this and still maintain the desired small clearance between the apertures 32 and the wire 14, the connecting legs 42 and 43 of the offset portions 36 are at an angle of about 20° to about 45°, preferably about 30°, to the longitudinal axis $A_W$ of the wire 14, and the radii of the bends between the retainer leg 40 and the angled legs 42 and 43 and between the major portion 34 of the wire 14 and the angled legs 42 and 43 are about 0.12 to about 0.25, preferably about 0.15 inches.

As best shown in FIGS. 1 and 2, the means 16 for controlling the angular orientation of the wires 14 includes an adjusting bar 44 having a longitudinal axis $A_{AB}$ and a plurality of longitudinally spaced notches or apertures 45, each of which engages a crank portion 37 on a wire 14. The adjusting bar 44 is mounted on the frame 12 for controlling and adjusting the angular orientation of the wires 14, and thereby controlling the angular orientation of the slats 18 and the size of the sieve openings (described below) between the slats 18.

A plurality of the elongated slats 18 are removably mounted end-to-end on the wires 14 in such a manner that the wires 14 cannot rotate relative to the slats 18. As best shown in FIGS. 1 and 6, the slats 18a, 18b 18c mounted on adjacent wires 14a, 14b, 14c are arranged in generally overlapping relationship with the respective adjacent slats 18a, 18b, 18c to define gaps or openings 46 through which the grain falls as the sieve assembly 10 is reciprocally moved or shaken. Each of the elongated slats 18 has a longitudinal axis $A_S$ (FIG. 4) and includes opposed end portions 49, 50, an elongated rear or straight edge portion 52, a serrated front edge portion 54 opposite the straight edge portion 52, a top surface 56 (FIGS. 8 and 9), and a bottom surface 58 opposite the top surface 56 and including front and rear portions 60 and 62.

Although the slats 18 are generally flat, as illustrated most clearly in FIG. 6, the straight edge portion 52 is angled downwardly relative to the front edge portion 54 along the longitudinal axis $A_S$, for example about 37°, to promote unrestricted flow of grain between adjacent slats.

Each slat 18 includes first and second wire securing means 64, 66 for removably receiving, respectively, the major portion 34 and offset portion 36 of the wire 14 (FIG. 4). In the illustrated embodiment of the invention, the first wire securing means 64 includes a plurality (e.g., 4) of longitudinally spaced pockets 68 on the bottom surface 58 for removably receiving the major portion 34 of the wire 14. Each of the pockets 68 is formed in the bottom surface 58 and generally along the longitudinal axis $A_S$. A longitudinally extending rib 70 depends from the underside of the slat 18 at the intersection of the bottom front surface 60 and bottom rear surface 62 (FIGS. 8 and 9) and extends generally along the longitudinal axis $A_S$. The rib 70 depends generally perpendicularly from the bottom rear surface 62. A plurality of longitudinal spaced gussets 71, one corresponding to each tooth on the serrated edge, extend laterally from the rib 70 to the bottom front surface 60 to reinforce the serrations. The rib 70 and gussets 71 protect the wire 14 from getting plugged with the crop being harvested and provide bending and torsion strength to the slat 18. An arm 74 having a terminal end 76 extends generally perpendicularly from the rib 70 in a direction generally opposite the gussets 71. The arm 74 is spaced from the bottom rear surface 62 at a distance at least as large as the maximum outside dimension of the wire 14. The arm 74 cooperates with a portion the rib 70 and the bottom rear surface 62 to define the pocket 68 which includes a rounded corner 87 and is dimensioned to fully receive the major portion 34 of the wire 14.

The first wire securing means 64 (FIG. 8) also includes means 84 for positively locking the major wire portion 34 in the pockets 68 to prevent accidental displacement of the slat 18 from the wire 14. In the illustrated embodiment of the invention, the positive locking means 84 is a deflectable finger 88 extending from the bottom rear surface 62 toward the arm 74 for each pocket 68. The finger 88 extends from the bottom rear surface 62 at an angle (e.g., about 25°) and includes an outer end portion 90 which cooperates with the arm 74 to define an opening 92 into the pocket 68. The outer end portion 90 of the finger 88 is movable between an undeflected position wherein the opening 92 is smaller than the maximum outside diameter of the wire 14 and a deflected position wherein the opening 92 is large enough to permit the wire to be received in the pocket 68.

The second wire securing means 66 (FIG. 9) includes an offset portion 94 in the straight edge portion 52 for receiving the retaining leg 40 of the wire offset portion 36. As best shown in FIG. 9, the slat offset portion 94 includes a wall portion 96 depending generally perpendicularly from the rear bottom surface 62 and a ledge 102 connected to and extending rearwardly from and generally perpendicularly to the wall portion 96. The wall portion 96 and the ledge 102 have a width somewhat less than the retaining leg 40 of the wire offset portion 36 and the ledge 102 is spaced from bottom surface 62 at a distance approximating the outside diameter of the wire 14 as shown in FIG. 4. The wall portion 96 and the ledge 102 and portions of the bottom rear surface 62 adjacent the opposite ends of the wall portion 96 and the ledge 102 cooperate to form a second pocket 104 for receiving the retaining leg 40 of the wire offset portion 36. The retaining leg 40 of the wire offset portion 36 fits snugly into the pocket 104 to prevent rotation of the wire 14 relative to the slat 18. The pocket 104 is open in a direction away from the major portion 34 of the wire 14.

The sieve assembly frame 12 and the wires 14 can be completely assembled prior to installing the slats 18. To install a slat 18, it is positioned with the outer surfaces of the fingers 88 against the wire 14 and the pocket 104 aligned with the retaining leg 40 of the wire offset portion 36. As a slat 18 is moved in a direction toward the wire 14, the retaining leg 40 of the wire offset portion 36 is guided into the pocket 104 and the main wire portion 34 cams the fingers 88 toward a deflected position until the openings 92 are large enough to permit the main wire portion 34 to enter the pockets 68. After the main wire portion 34 has snapped into place in a pocket 68, the finger 88 returns to the undeflected position as shown in FIG. 8 wherein the opening 92 is smaller than the outside diameter of the wire 14 and the outer end portions 90 of the fingers 88 prevent the wire 14 from being removed from the pockets 68. Thus, the fingers 88 cooperate with the arms 74 to positively lock the wire 14 in the pockets 68 in such a manner that the slat 18 cannot be accidentally displaced from the wire 14.

To remove a damaged slat 18 from the wire, all the fingers 88 must be destroyed or mechanically depressed to the deflected position by pinching or prying with a suitable tool such as pliers, a screwdriver or the like. This can be accomplished without disassembling any part of the frame, as can installation of a replacement slat.

To facilitate fabrication, reduce material costs, eliminate corrosion and provide the fingers 88 with the desired flexibility for snap in mounting, the slats 18 preferably are molded from a durable, relatively rigid synthetic thermoplastic or thermosetting material. Suitable commercially available plastic materials include nylon, acetals and urethanes, with or without fillers such as mineral or glass, marketed by E. I. du Pont de Nemours, Celanese and B. F. Goodrich.

In operation, grain and chaff pass over the top surfaces 56 of the slats 18 in the agitated sieve assembly 10. As the sieve assembly 10 is agitated, grain particles pass downwardly through the openings 46 and are thereby separated from the chaff passing over the top surfaces 56. On each slat 18, the first pockets 68 capture the major portion 34 of the wire 14, and the second pocket 104 captures the offset portion 40 of the wire 14. The first and second pockets 68 and 104 cooperate to prevent rotation of the wire 14 relative to the slats 18. The fingers 88 cooperate with the arms 74 to prevent the major portion 34 of the wire 14 from being displaced from the first pockets 68, thereby preventing accidental displacement of the slat 18 from the wire 14.

By molding the slats 18 from a synthetic plastic material in accordance with a preferred embodiment, the top and bottom surfaces can be designed to be quite smooth which promote rapid flow over the adjacent slats and thereby increase the capacity of the sieve assembly. As shown in FIGS. 6, 8 and 9, the major portion 34 of the wire 14 is "sheltered" or "hidden behind" the rib 70 and the arm 74 and the retaining leg 40 of the wire offset portion 36 is "sheltered" by the wall portion 96 and the ledge 102 with respect to flow of material between adjacent slats 18 as illustrated by arrows in FIGS. 8 and 9. This, coupled with smooth top and bottom surfaces, substantially reduces the likelihood of plugging and snagging of material between the slats and the wire, particularly crop and/or weeds which are bearded and/or have fine stems.

We claim:

1. A sieve assembly for a combine comprising a frame including a pair of laterally spaced, elongated side members and at least one divider member disposed between and extending parallel to said side members, said side and divider members including a plurality of longitudinally spaced, circular apertures having an inside diameter and aligned in rows;

a circular wire extending through each row of said side and divider member apertures, each of said wires having an outside diameter and including a major portion having a longitudinal axis and an offset portion including a longitudinally extending retainer leg spaced radially outwardly from and parallel to said longitudinal axis and a pair of connecting legs connected between the opposite ends of said retaining leg and said major portion, said connecting legs extending at an angle from said major portion and each including bends having a radius at the connection with said major portion and with said retaining leg;

means for rotating said wires to adjust the angular orientation of said wires; and at least one slat mounted on each of said wires, the inside diameter of said side and divider member apertures being approximately the same as, but slightly greater than, the outside diameter of said wire and the angle of said connecting legs and the radii of said bends being such that said offset portion can be threaded through said side and divider member apertures for assembling said sieve assembly.

2. The sieve assembly according to claim 1 wherein said angle is about 20° to about 45°.

3. The sieve assembly according to claim 2 wherein said angle is about 30°.

4. The sieve assembly according to claim 2 wherein said radii is about 0.12 to about 0.25 inch.

5. The sieve assembly according to claim 4 wherein said radii is about 0.15 inch.

6. A sieve assembly for a combine comprising a frame including a pair of opposed, generally parallel side members;

a wire rotatably supported on and extending transversely between said side members and including a major portion having a longitudinal axis and a maximum outside diameter and an offset portion spaced radially outwardly from said longitudinal axis;

means for rotating said wire relative to said side members to adjust the angular orientation of said wire; and an elongated slat mounted on said wire, extending between and unconnected to said side members and including first wire securing means including a first pocket for removably receiving said major portion and a deflectable finger extending toward said first pocket and including an outer end portion having an outer edge, said finger cooperating with said pocket to define an opening into said first pocket movable between a deflected position wherein said opening is larger than the maximum outside dimension of said major portion to permit movement thereof into said first pocket and an undeflected position wherein said finger extends toward said first pocket to a location wherein said outer edge positively blocks removal of said major portion from said first pocket until said finger is moved to the deflected position by, application of a depressing force thereon or destroyed thereby preventing accidental displacement of said slat from said wire, and a second wire securing means having a second pocket for removably receiving said wire offset portion to prevent rotational movement of said wire relative to said slat.

7. The sieve assembly according to claim 6 wherein said finger is arranged so that, as said slat is being moved toward said wire during installation of said slat, said finger engages said major portion and is cammed thereby to the deflected position.

8. The sieve assembly according to claim 6 wherein, after slat installation, the depressing force for moving said finger from the undeflected position to the deflected position can be applied by a tool.

9. The sieve assembly according to claim 6 wherein slat is formed from a synthetic thermoplastic or thermosetting material.

10. The sieve assembly according to claim 6 wherein said slat has an underside, a longitudinally extending rib depending from the underside of said slat and an area cooperating with said rib to form said first pocket, said rib extending along the length of said slat and located to shelter said wire against material passing beneath said slat and thereby prevent such material from becoming snagged between said wire and said slat.

11. A sieve assembly for a combine comprising a frame including a pair of opposed, elongated side members and at least one elongated divider member disposed between and extending parallel to said side members, said side and divider members including a plurality of longitudinally spaced, circular apertures having an inside diameter and aligned in rows;

a circular wire extending through each row of said side and divider member apertures, each of said wires including a major portion having a maximum outside diameter, a longitudinal axis and an offset portion including a longitudinally extending retainer leg spaced radially outwardly from and generally parallel to said longitudinal axis and a pair of connecting legs connected between the opposite ends of said retaining leg and said major portion, said connecting legs extending at an angle from said major portion and each including bends having a radius at the connection with said major portion and with said retaining leg;

means for rotating said wire relative to said side and divider members to adjust the angular orientation of said wire; and an elongated slat formed from a synthetic thermoplastic or thermosetting material mounted on said wire, extending between and unconnected with each said member and divider member and including first wire securing means including a first pocket for removably receiving said major portion and a deflectable finger extending toward said first pocket and including an outer end portion having an outer edge, said finger cooperating with said first pocket to define an opening into said first pocket, said finger being movable between a deflected position wherein said opening is larger than the maximum outside diameter of said major portion to permit movement thereof into said first pocket and an undeflected position wherein said finger extends toward said first pocket to a location wherein said outer edge positively blocks removal of major portion from said first pocket until said finger is moved to the deflected position by application of a depressing force or destroyed, thereby preventing accidental displacement of said slat from said wire, and a second wire securing means having a second pocket for removably receiving the offset portion of said wire to prevent rotational movement of said wire relative to said slat.

12. The sieve assembly according to claim 11 wherein said finger is arranged so that, as said slat is being moved toward said wire during installation of said slat, said finger engages said major portion and is cammed thereby to the deflected position.

13. The sieve assembly according to claim 11 wherein said angle is about 20° to about 45°.

14. The sieve assembly according to claim 12 wherein said angle is about 30°.

15. The sieve assembly according to claim 11 wherein said radii are about 0.12 to about 0.25 inch.

16. The sieve assembly according to claim 15 wherein said radii are about 0.15 inch.

* * * * *